(12) United States Patent
Takagaki et al.

(10) Patent No.: US 12,382,884 B2
(45) Date of Patent: Aug. 12, 2025

(54) WATERING CAN (71) Applicant: HACHIMAN-KASEI CO., LTD., Gujo (JP)

(72) Inventors: Katsuro Takagaki, Gujo (JP); Tetsuya Yamauchi, Gujo (JP)

(73) Assignee: HACHIMAN-KASEI CO., LTD., Gifu (JP)

( * ) Notice: Subject to any disclaimer, the term of this patent is extended or adjusted under 35 U.S.C. 154(b) by 0 days.

(21) Appl. No.: 18/857,297

(22) PCT Filed: Dec. 18, 2023

(86) PCT No.: PCT/JP2023/045178
§ 371 (c)(1),
(2) Date: Oct. 16, 2024

(87) PCT Pub. No.: WO2024/135581
PCT Pub. Date: Jun. 27, 2024

(65) Prior Publication Data
US 2025/0120353 A1    Apr. 17, 2025

(30) Foreign Application Priority Data

Dec. 23, 2022 (JP) ................................ 2022-206425

(51) Int. Cl.
*A01G 25/14* (2006.01)
(52) U.S. Cl.
CPC .................................. *A01G 25/14* (2013.01)
(58) Field of Classification Search
CPC ................................................... A01G 25/14
See application file for complete search history.

(56) References Cited

U.S. PATENT DOCUMENTS 2,539,559 A * 1/1951 Ward ...................... B05B 11/01
                                                      239/377
2,948,522 A * 8/1960 Peters .................... B22D 41/00
                                                      222/570

(Continued)

FOREIGN PATENT DOCUMENTS

CN    213847568 U  *  8/2021
JP       1-99128 U      7/1989

(Continued)

OTHER PUBLICATIONS

International Search Report dated Mar. 5, 2024, issued in counterpart International Application No. PCT/JP2023/045178 (4 pages).

(Continued)

*Primary Examiner* — Donnell A Long
(74) *Attorney, Agent, or Firm* — WHDA, LLP (57) ABSTRACT

The watering can 2 includes: a water storage 30 with a bottomed tubular shape including a bottom wall 31 and a side wall 32; and a spout 10 communicating with the water storage and allowing water to flow out of the water storage. The flow channel 15 of the spout has a plurality of recessed grooves 15g extending in parallel in a direction of water flow. A handle 50 is orthogonal to a front-rear direction in which the spout extends, the handle being bridged between right and left ends of the side wall. Spindles 50s provided at both ends of the handle are inserted into spindle holes (not illustrated) provided at right and left ends of the side wall, and the handle is rotatably attached to the side wall. A grip 60 is disposed at a rear end of the side wall.

6 Claims, 11 Drawing Sheets

(56) References Cited

U.S. PATENT DOCUMENTS

| | | | | |
|---|---|---|---|---|
| 4,030,664 A * | 6/1977 | Tisbo | ................. | B05B 11/0037 |
| | | | | 239/289 |
| 4,392,594 A * | 7/1983 | Swett | .................... | A01G 25/14 |
| | | | | 222/530 |
| 2003/0102336 A1* | 6/2003 | Mason | ................... | A01G 25/14 |
| | | | | 222/478 |
| 2012/0055833 A1* | 3/2012 | Thibault | ............... | A01G 25/14 |
| | | | | 206/503 |

FOREIGN PATENT DOCUMENTS

| | | | |
|---|---|---|---|
| JP | 2005-278984 A | 10/2005 | |
| JP | 2007-143442 A | 6/2007 | |

OTHER PUBLICATIONS

Notice of Reasons for Refusal dated May 20, 2024, issued in counterpart JP Patent Application No. 2024-515672, w/ English translation (8 pages).

Decision to Grant a Patent dated Jun. 4, 2024, issued in counterpart JP Patent Application No. 2024-515672, w/ English translation (4 pages).

* cited by examiner

WATERING CAN

TECHNICAL FIELD

The present invention relates to a watering can. More specifically, the present invention relates to a watering can that facilitates adjustment of a sprinkling amount with a simple configuration.

BACKGROUND ART

Conventionally, a watering can is used for watering plants in home gardening or the like, and is usually a portable container having a spout on a front surface of the container which is a water storage unit.

The spout of the watering can is usually fitted with a rose head like a cap with many small holes. The rose head weakens a water stream and converts it to a shower, and can thereby prevent plants and soil from being damaged.

However, the watering from the rose head tends to diffuse the water stream and sprinkle in a wide area, and thus a place where sprinkling should be avoided, such as a leaf or a flower of a plant, tends to be sprinkled.

By contrast, when the rose head is removed to form a single pipe-shaped water pouring port, local water injection is possible, but there is a risk of producing the defect that the water is strongly and locally discharged to the soil near the base of the plant, and the soil is dug up. Furthermore, there is also a risk of losing the removed rose head.

Here, a sprinkling structure of a watering can capable of adjusting a sprinkling amount has been proposed (refer to, for example, Patent Literature 1). The sprinkling structure of Patent Literature 1 can be used if a large number of pipes having a small diameter are bound to each other and are coupled to an existing jug. Since the pipes are converged at appropriate intervals, the discharged water streams are not merged, and it is possible to accurately discharge water and arbitrarily select a sprinkling area of the water.

CITATIONS LIST

Patent Literature

Patent Literature 1: JP 2007-143442 A

SUMMARY OF INVENTION

Technical Problems

However, in the sprinkling structure described in Patent Literature 1, it is necessary to bind a large number of pipes having a small diameter with an elastic tube, and further connect an elastic hose of the elastic tube to be coupled to a water supply pipe of the jug, the configuration of the sprinkling structure being complicated.

An object of the present invention is to provide a watering can that facilitates adjustment of a sprinkling amount with a simple configuration.

SOLUTIONS TO PROBLEMS

The present invention to solve the above problems is as follows.
1. A watering can including:
    a water storage with a bottomed tubular shape including a bottom wall and a side wall; and
    a spout communicating with the water storage and allowing water to flow out of the water storage, wherein
    a flow channel of the spout has a plurality of recessed grooves extending in parallel in a direction of water flow, and
    in side view, the flow channel is inclined upward from a base end to a distal end of the spout and formed to be curved and convex upward and outward.
2. The watering can according to item 1, further including a handle and/or a grip, wherein
    the handle is bridged between a pair of the side walls opposite each other, and
    the grip is provided on the side wall.
3. The watering can according to item 1 or 2, wherein the recessed grooves are formed such that the distal end of the spout is slightly narrowed.
4. The watering can according to item 1 or 2, wherein inner surfaces of bottoms of the recessed grooves are formed such that the distal end of the spout slightly bulges out.
5. The watering can according to item 1 or 2, further including a recessed portion circumferentially provided near an outer peripheral end on an outer surface of the bottom wall.
6. The watering can according to item 1 or 2, further including a rib for reinforcement provided at an upper end of the spout and/or an upper end of the side wall.

ADVANTAGEOUS EFFECTS OF THE INVENTION

1. A watering can according to the present invention includes: a water storage with a bottomed tubular shape including a bottom wall and a side wall; and a spout communicating with the water storage and allowing water to flow out of the water storage, in which a flow channel of the spout has a plurality of recessed grooves extending in parallel in a direction of water flow, so that adjustment of a sprinkling amount is facilitated with a simple configuration.
2. Furthermore, when the watering can includes a handle and/or a grip, the handle being bridged between a pair of the side walls opposite each other, and the grip being provided on the side wall, it is possible to support the watering can by gripping the handle and/or the grip, which is convenient to carry and facilitates watering.
3. When the recessed grooves are formed such that the distal end of the spout is slightly narrowed, the water streams of the respective recessed grooves are narrowed, without being merged, to be separate narrow water streams, and adjustment of the sprinkling amount is further facilitated.
4. When inner surfaces of bottoms of the recessed grooves are formed such that the distal end of the spout slightly bulges out, the water flowing out from the spout strongly climbs over the distal end to be discharged, so that it is possible to prevent the water from dropping from the distal end of the spout.
5. When the watering can further includes a recessed portion circumferentially provided near an outer peripheral end on an outer surface of the bottom wall, it is easy to hook a hand on the recessed portion to support the bottom, which is convenient for watering.
6. When the watering can further includes a rib for reinforcement provided at an upper end of the spout and/or an upper end of the side wall, the opening of the watering can is reinforced.

DESCRIPTION OF EMBODIMENTS

Hereinafter, the present invention will be described in detail with reference to FIGS. 1 to 11 illustrating the embodiments of the present invention.

The present invention is not limited to the specific examples illustrated in the drawings, and various modifications can be made based on the purpose and usage.

First Embodiment

Figure 1:
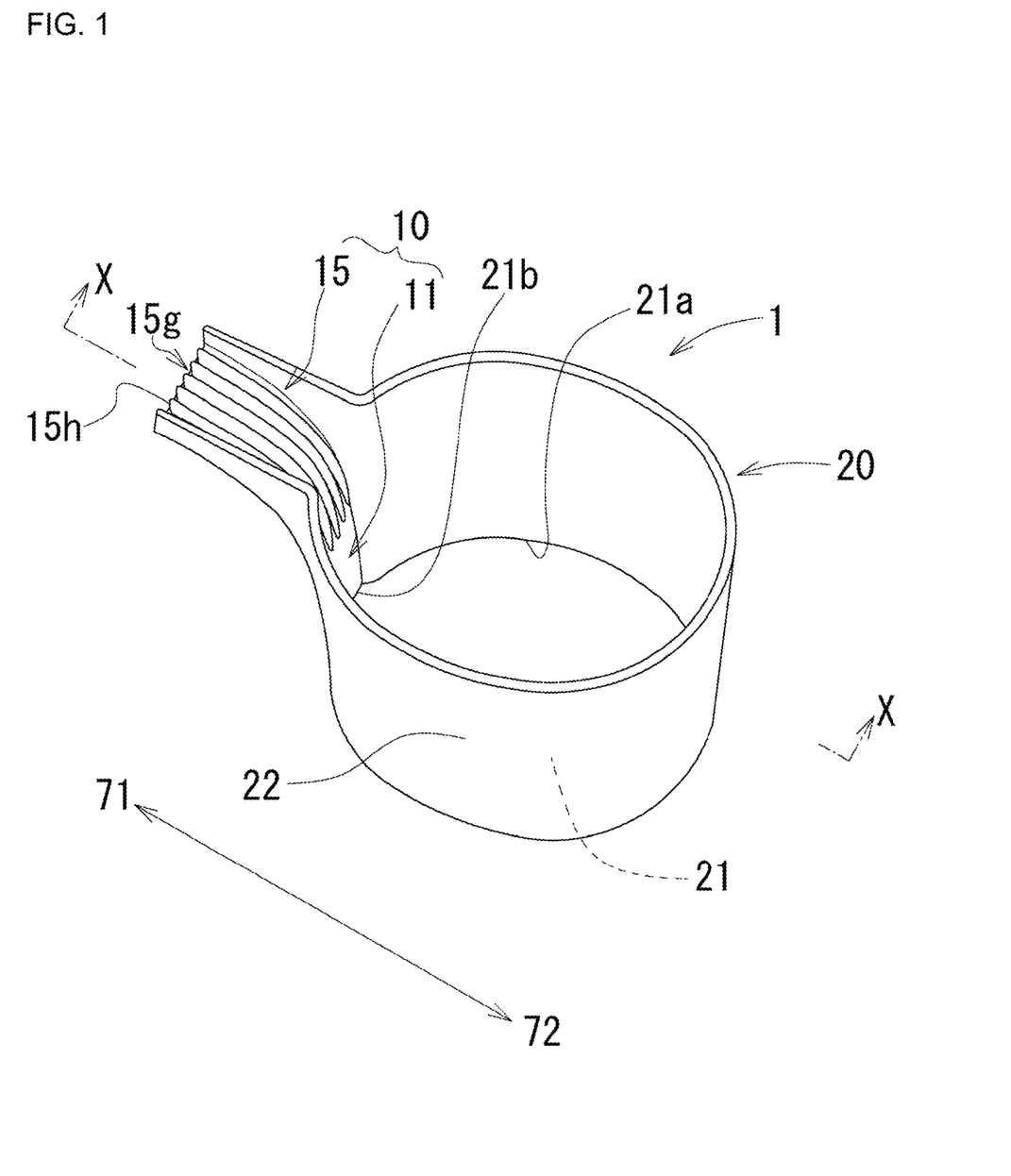
FIG. 1 is a schematic perspective view of a watering can according to a first embodiment.

As illustrated in FIG. 1, a watering can 1 according to a first embodiment includes a water storage 20 and a spout 10.

The water storage 20 is a part that stores water for watering, and is formed in a bottomed tubular shape including a bottom wall 21 and a side wall 22.

The water storage is not particularly limited as long as the water storage is formed in a bottomed tubular shape including a bottom wall and a side wall, and the side wall may have a rectangular tubular shape or an elliptical tubular shape in addition to a cylindrical shape. In addition, the boundary between the bottom wall and the side wall does not need to be obvious, and for example, the bottom wall and the side wall may be gently continuous.

Figure 2:
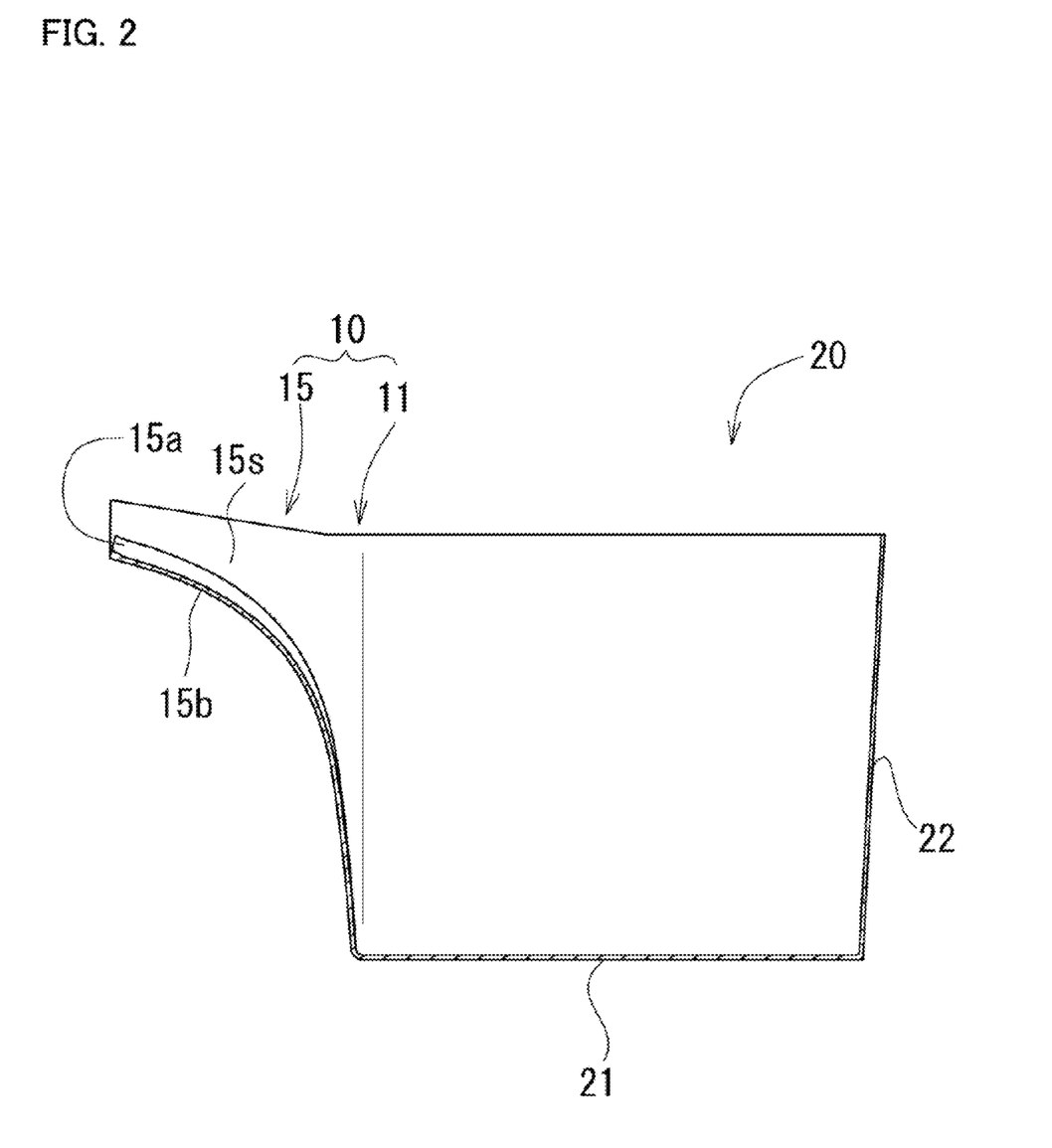
FIG. 2 is a sectional view taken along line X-X in FIG. 1.

The spout 10 is a part that communicates with water storage 20 and allows water from water storage 20 to flow out. As illustrated in FIGS. 1 and 2, the spout 10 includes a base end 11 communicating with water storage 20 and a flow channel 15 communicating with the base end 11. Although the boundary between the base end 11 and the flow channel 15 does not need to be obvious, the flow channel 15 has a wave shape so as to have a plurality of recessed grooves 15g extending in parallel in a direction of water flow.

Figure 3:
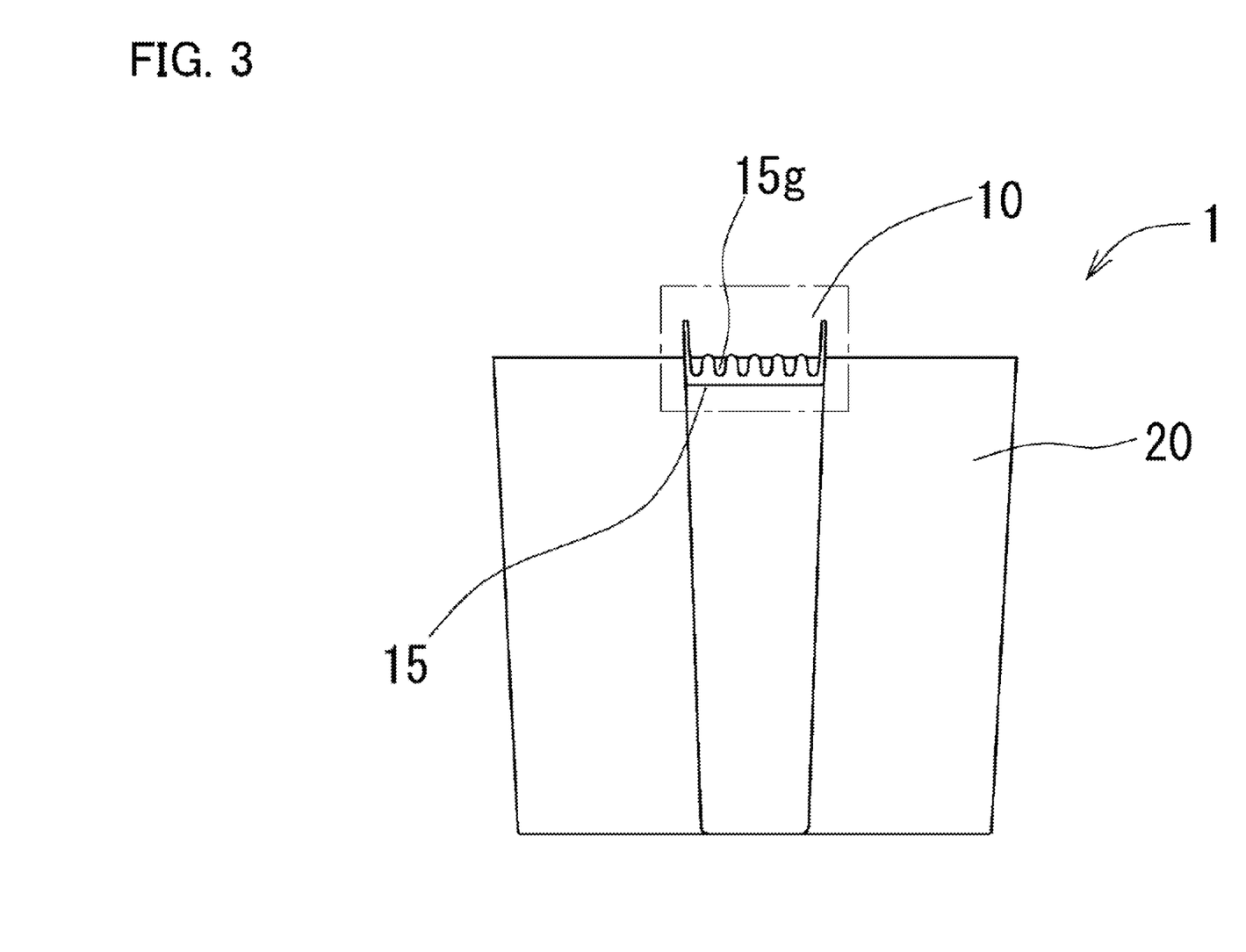
FIG. 3 is a schematic front view of the watering can according to the first embodiment.

As illustrated in FIG. 3, the "recessed grooves 15g" mentioned above are grooves having a recessed cross section.

Figure 4A:
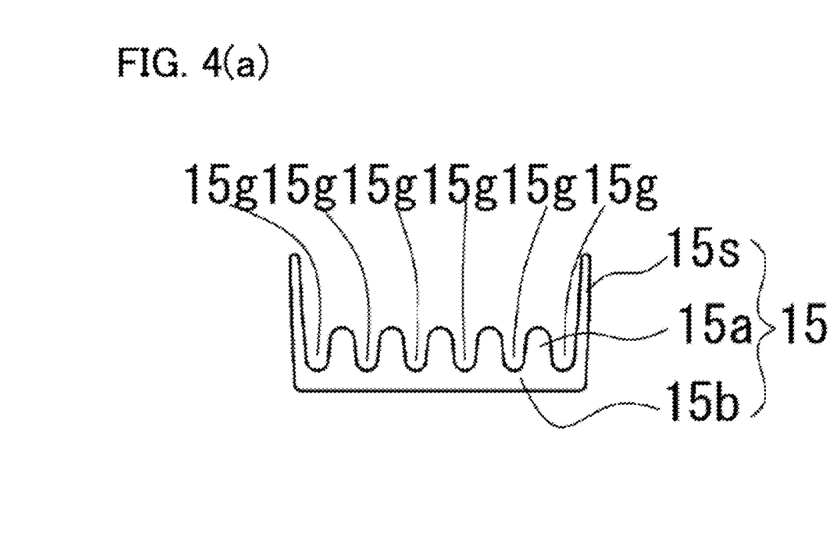
FIG. 4(a) is an enlarged view of a flow channel surrounded by a one-dot chain line in FIG. 3.

As illustrated in FIG. 4(a), the flow channel 15 includes: a pair of sides 15s with a plate shape erected at both ends of a bottom 15b with a plate shape; and five protruding tips 15a with a long plate shape in the direction of water flow, and thereby forms six recessed grooves 15g through which water flows. The upper end of each protruding tip 15a has a semicircular cross section. The lower end of each recessed groove 15g has a semicircular cross section, and the entire recessed groove 15g has a U-shaped cross section.

Figure 4B:
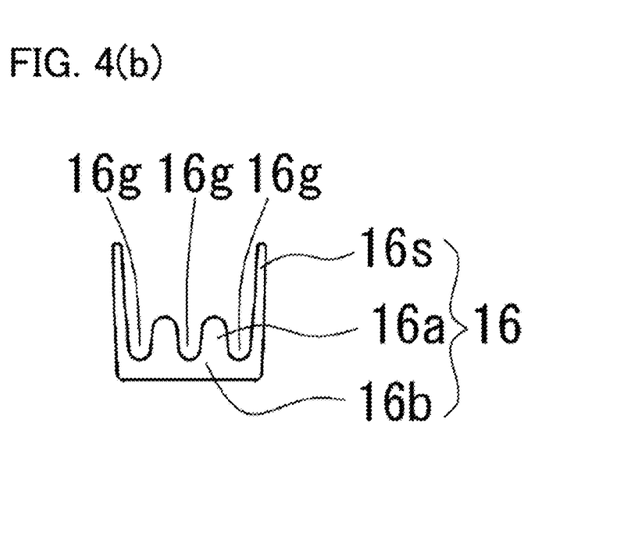
FIG. 4(b) is an enlarged view of a flow channel of another example corresponding to FIG. 4(a)

As illustrated in FIG. 4(b), a flow channel 16 may include: a pair of sides 16s with a plate shape erected at both ends of a bottom 16b with a plate shape; and two protruding tips 16a, and may thereby form three recessed grooves 16g through which water flows.

That is, the number of the recessed grooves is not particularly limited, and is usually three to five, but may be two to eight or nine or more.

The shape of the flow channel is not particularly limited as long as the flow channel is formed such that there is a plurality of recessed grooves extending in parallel in the direction of water flow. That is, the length of the flow channel protruding from the water storage is not particularly limited, and the length can be appropriately set based on the usage. Furthermore, the lateral width of the flow channel is not limited, and the length of the lateral width can be set based on the usage.

Figure 4C:
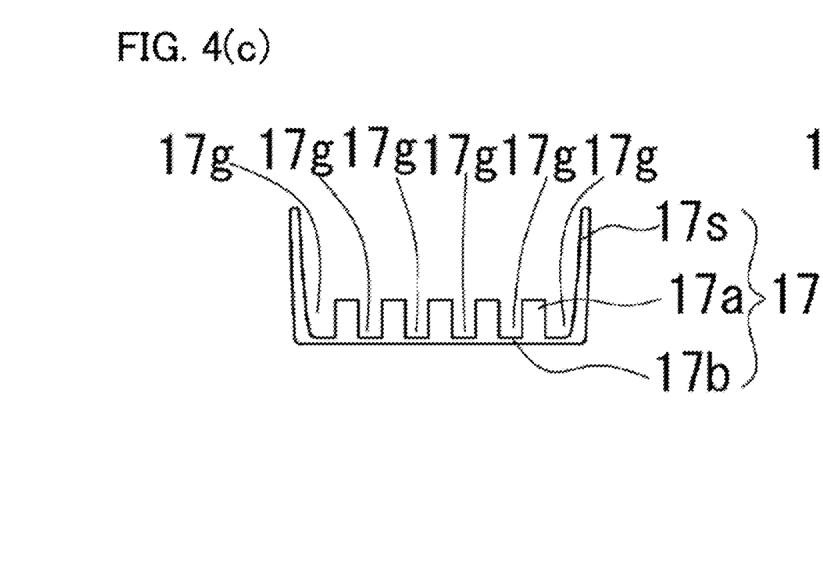
FIG. 4(c) is an enlarged view of a flow channel of still another example corresponding to FIG. 4(a)
Figure 4D:
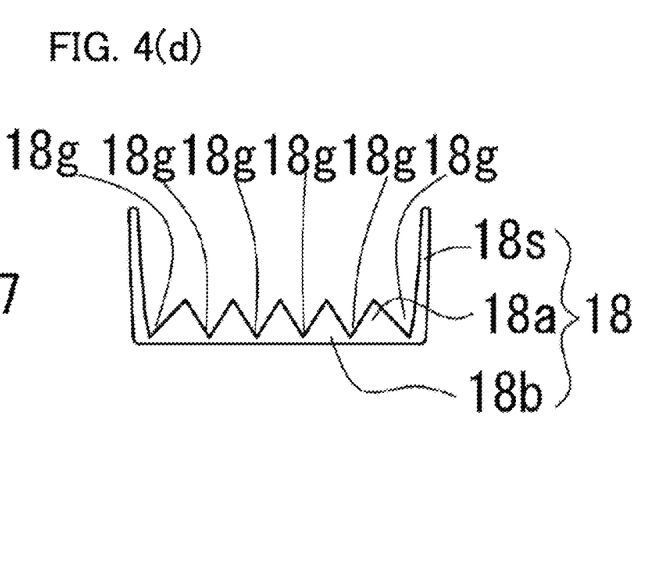
FIG. 4(d) is an enlarged view of a flow channel of still another example corresponding to FIG. 4(a).

Furthermore, the shape of the recessed groove included in the water flow channel is not particularly limited, and for example, as illustrated in FIG. 4(c), a flow channel 17 may include: a pair of sides 17s with a plate shape erected at both ends of a bottom 17b with a plate shape; and five protruding tips 17a having a rectangular cross section, and may thereby form six recessed grooves 17g with a rectangular-wave shape. Furthermore, as illustrated in FIG. 4(d), a flow channel 18 may include: a pair of sides 18s with a plate shape erected at both ends of a bottom 18b with a plate shape; and five protruding tips 18a with a triangular cross section, and may thereby form six recessed grooves 18g with a triangular-wave shape.

Figure 5:
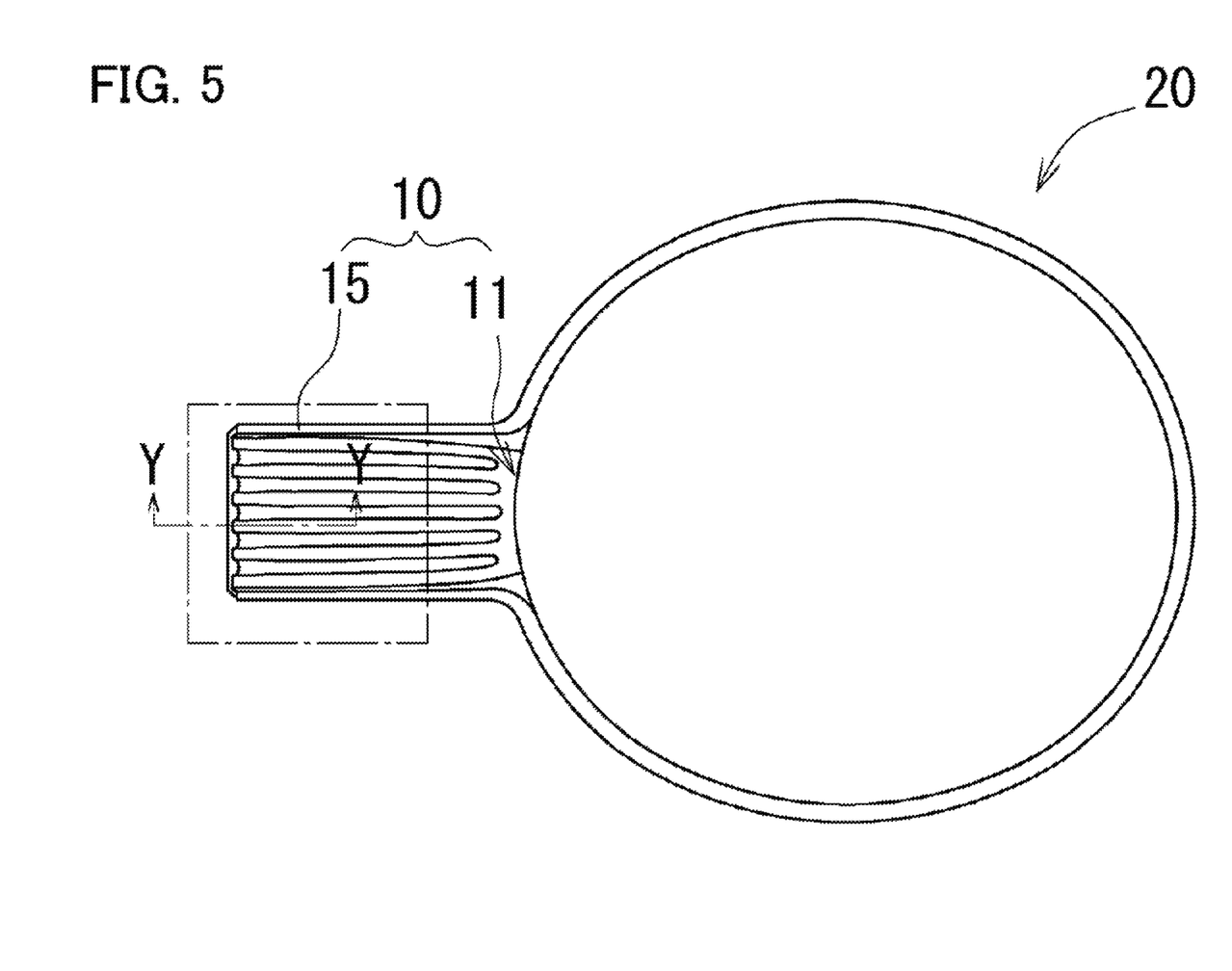
FIG. 5 is a schematic plan view of the watering can according to the first embodiment.
Figure 6:
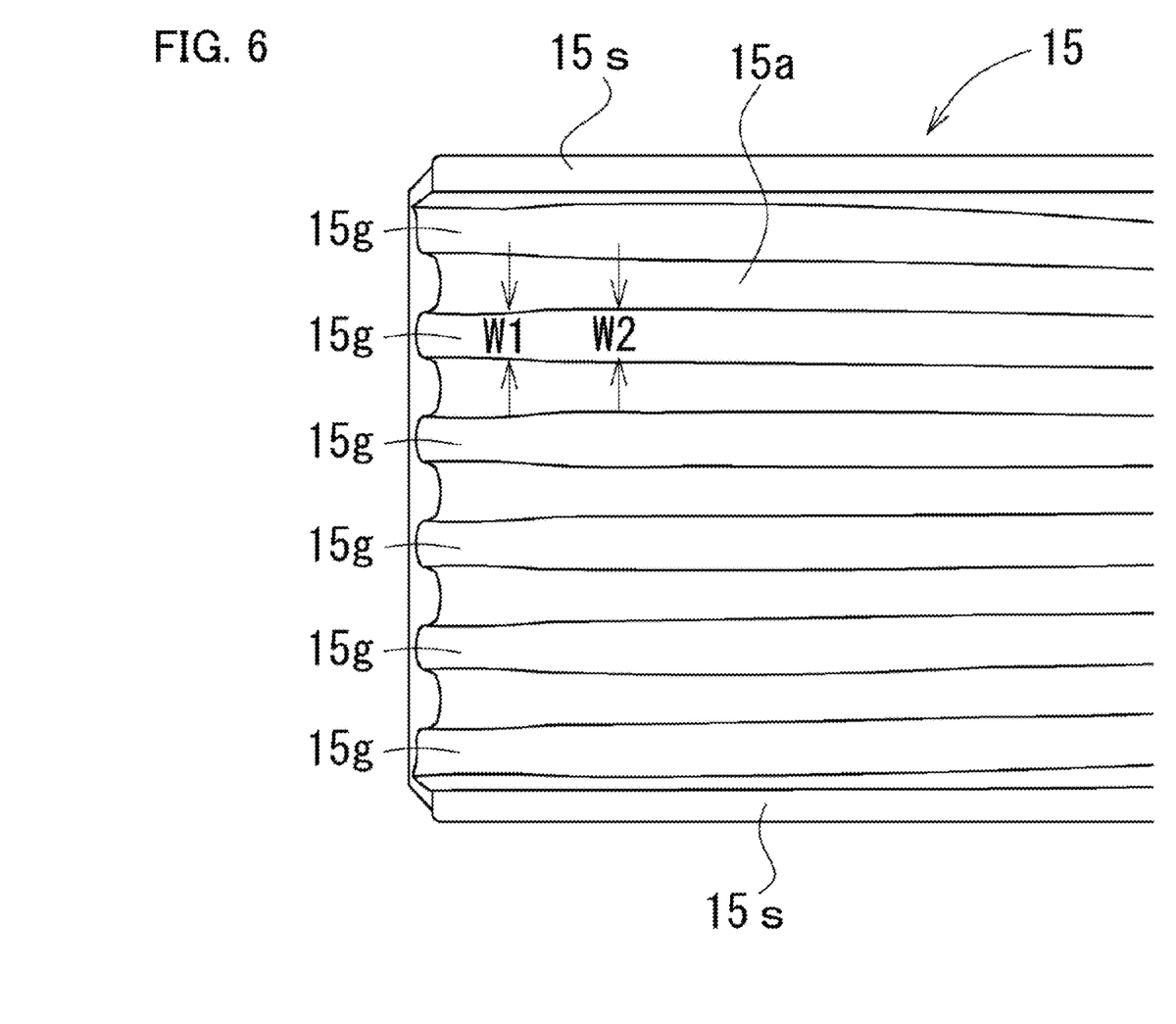
FIG. 6 is an enlarged view of a portion surrounded by a one-dot chain line in FIG. 5.

As illustrated in FIGS. 5 and 6, it is preferable that the recessed grooves 15g are formed such that the distal end of the spout 10 is slightly narrowed. That is, a width W1 of the recessed groove 15g at the distal end portion is formed to be narrower than a width W2 of the recessed groove 15g having substantially the same width up to the distal end. In that manner, at the distal end, the water streams of the respective recessed grooves are narrowed, without being merged, to be separate narrow water streams, and adjustment of the sprinkling amount is made easier.

Figure 7:
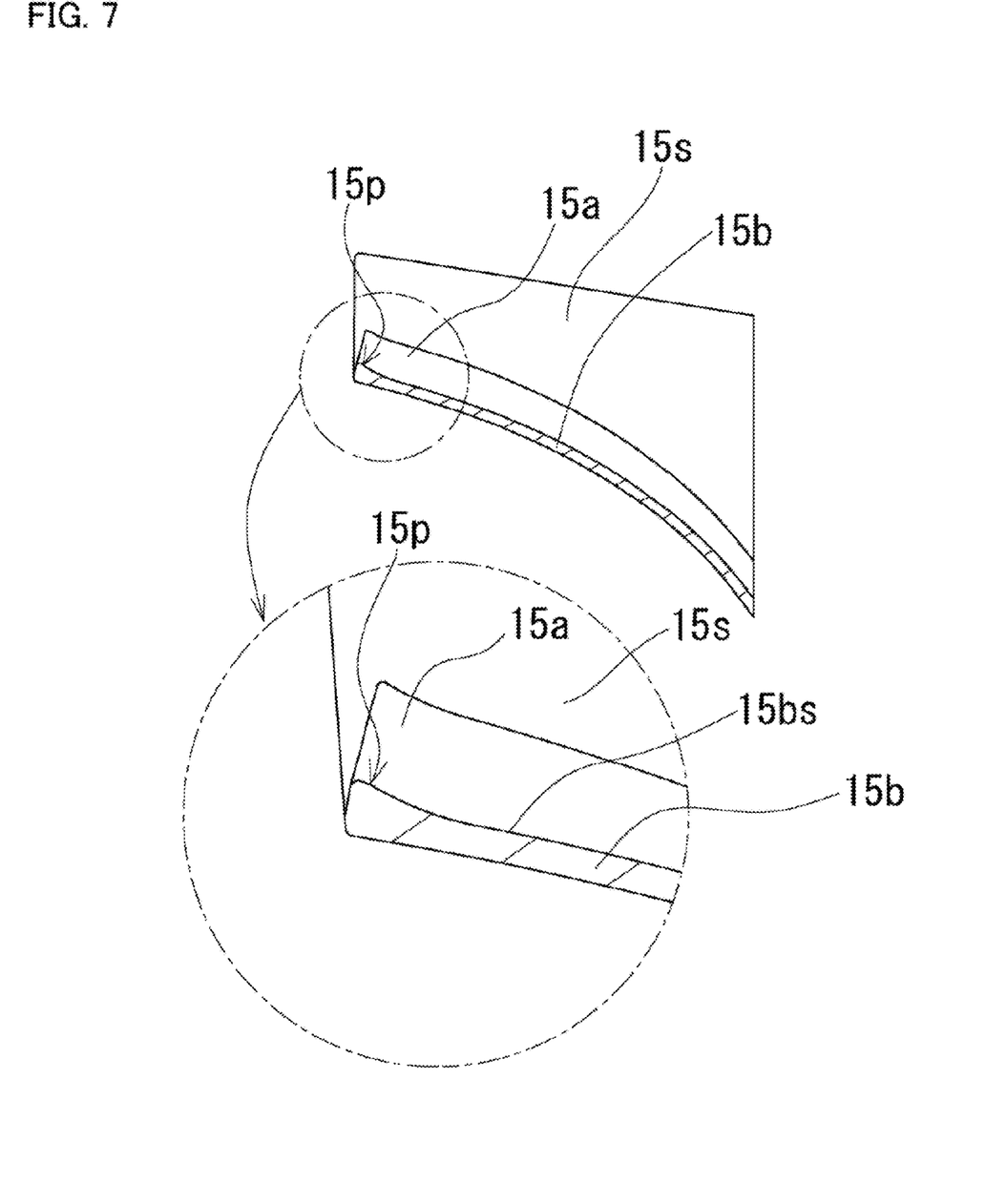
FIG. 7 is a sectional view taken along line Y-Y in FIG. 5 and an enlarged view of the sectional view.

As illustrated in FIG. 7, it is preferable that inner surfaces 15bs of bottoms 15b of the recessed grooves 15g are formed such that the distal end of the spout 10 slightly bulges out.

That is, the distal end of the inner surface 15bs of each bottom 15b slightly bulges out to form a bulge 15p. In that manner, the water flowing out from the spout 10 strongly climbs over the bulge 15p to be discharged, so that it is possible to prevent the water from dripping from the distal end of the spout 10.

Compared with a conventional watering can with a rose head, the watering can 1 has less water resistance for allowing water to flow out from the recessed grooves 15g. That is, in the case of the watering can with a rose head having a large number of holes, the resistance of a perforated surface with holes to water is large, and the total amount of water is likely to decrease.

By contrast, in the watering can 1, it is possible to increase the total amount of water in a short time since there is no resistance surface against the direction of the water stream. Furthermore, since the plurality of recessed grooves 15g are provided, the amount of water to be flowed out can be divided to small quantities by the respective recessed grooves 15g. This enables efficient plant-friendly watering in a short time.

Furthermore, in the watering can 1, the water stream is not dispersed in a wide range as in the case of a rose head, so that, for example, the sprinkling area can be limited to a narrow area in the case of watering a plant in a flowerpot, and it is easy to prevent water from spilling from the flowerpot. This enables the watering can 1 to be used in a room or facility.

In addition, since the water storage 20 and the spout 10 of the watering can 1 are opened at upper portions, watering can be done while checking a water flow, so that adjustment of the sprinkling amount is facilitated.

However, the water storage 20 or the spout 10 may further include a lid that covers the upper portion of the opening.

As shown in FIG. 1, the bottomed tubular shape has a forward side 71 and a backward side 72. The bottom wall 21 includes a first circumferential base end 21a and a second circumferential base end 21b.

The material of the watering can 1 is not particularly limited, and may be made of resin, metal, wood, or other materials. Among them, the resin is preferable. The watering can 1 made of resin can be integrally molded. Examples of the resin include polyethylene, polypropylene, polystyrene, polyethylene terephthalate (PET), and polyvinyl chloride. The materials of the spout and the water storage may be different.

Second Embodiment

Figure 8:
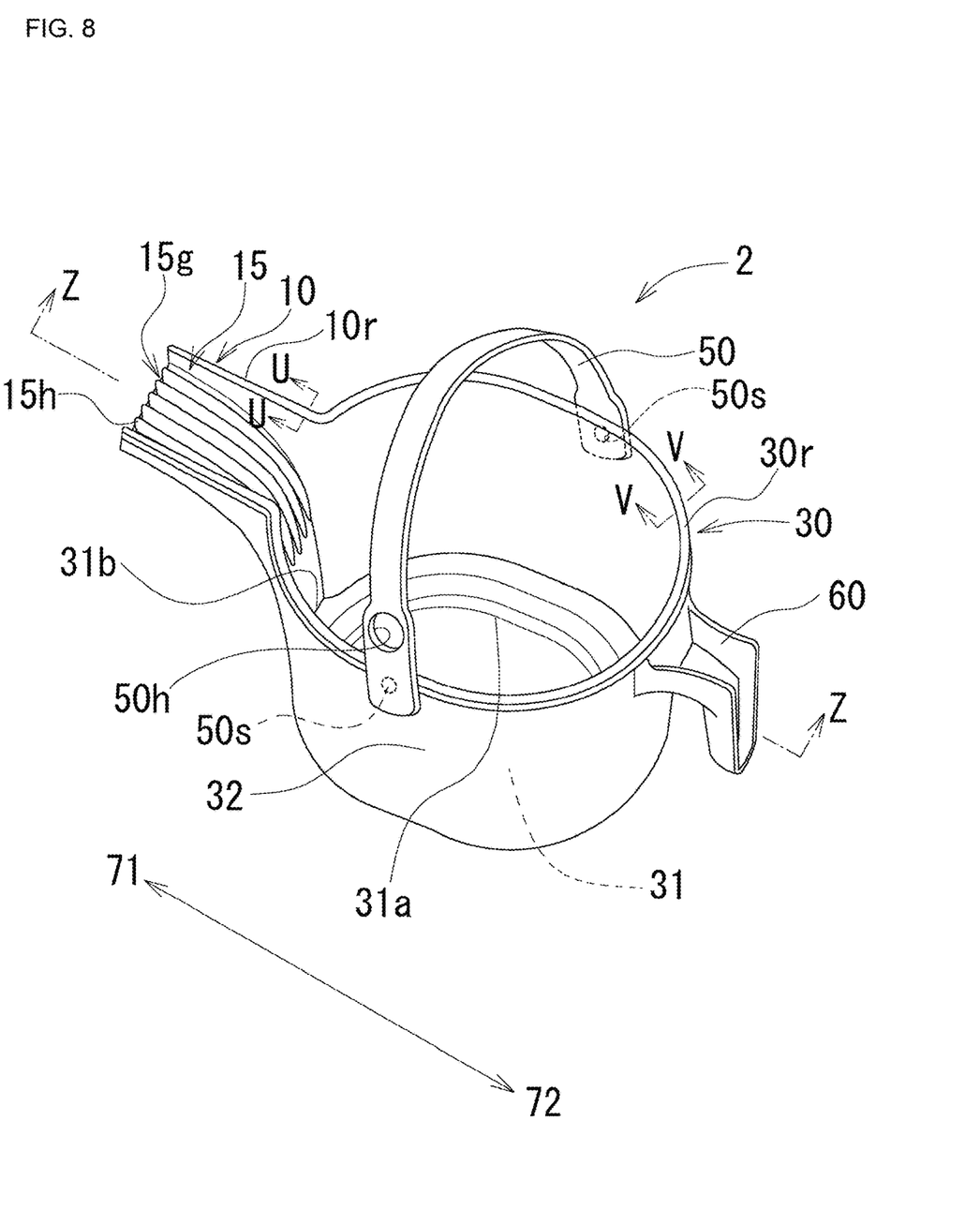
FIG. 8 is a schematic perspective view of a watering can according to a second embodiment.

As illustrated in FIG. 8, a watering can 2 according to a second embodiment includes a water storage 30, the spout 10 communicating with the water storage 30, a handle 50, and a grip 60. As for the spout 10, except for ribs 10r and 30r described later, the spout 10 according to the first embodiment directly communicates with the water storage 30. The configuration and operational effect of the spout 10 are as described in the first embodiment.

The water storage 30 is formed in a bottomed tubular shape including a bottom wall 31 and a side wall 32.

The handle 50 is orthogonal to a front-rear direction in which the spout 10 extends, the handle 50 being bridged between right and left ends of the side wall 32. Spindles 50s provided at both ends of the handle 50 are inserted into spindle holes (not illustrated) provided at right and left ends of the side wall 32, and the handle 50 is rotatably attached to the side wall 32.

A hole 50h bored in the handle 50 is convenient because water can be poured into the water storage 30 by inserting and fixing a water hose.

The handle 50 may be formed such that the handle 50 firmly fix to the right and left ends of the side wall 32 so as not to be rotatable.

The grip 60 is disposed at a rear end of the side wall 32. The shape of the grip 60 is not particularly limited as long as it can be held by a hand. There is no particular limitation as long as the grip 60 is provided on the side wall 32, and the grip 60 may be provided on the right and left ends other than the rear end.

The grip 60 may be integrally molded with the side wall 32, or may be formed separately and attached to the side wall 32.

Figure 9A:
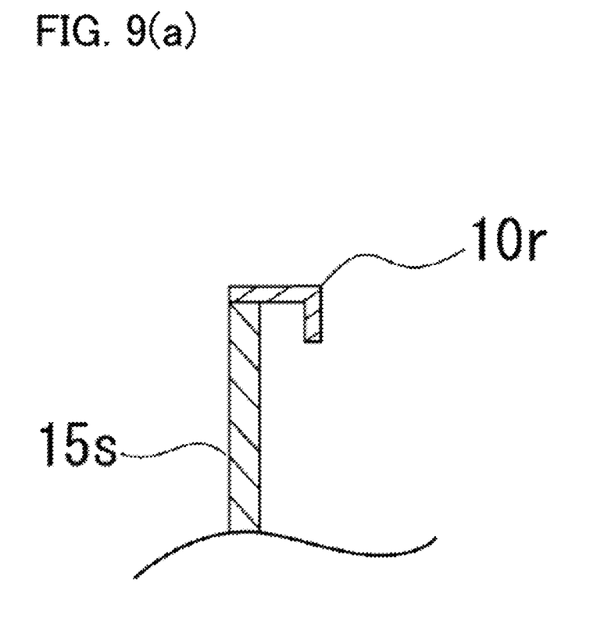
FIG. 9(a) is a sectional view taken along line U-U in FIG. 8.
Figure 9B:
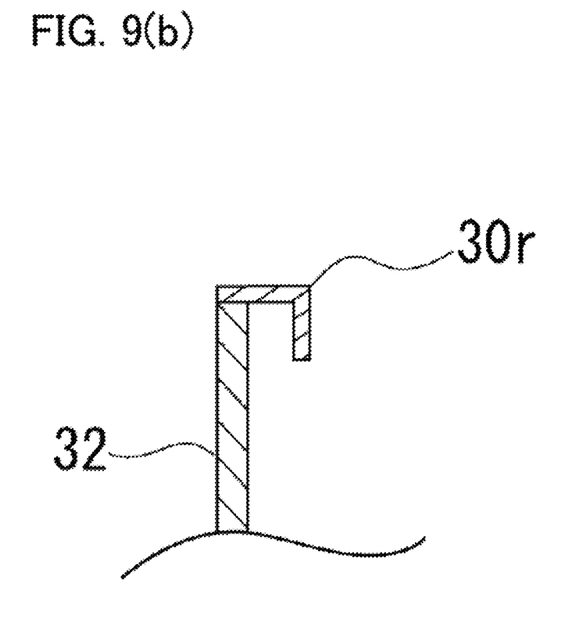
FIG. 9(b) is a sectional view taken along line V-V in FIG. 8.

The ribs 10r and 30r for reinforcement are provided at the upper end of the spout 10 (the upper ends of the sides 15s) and the upper end of the side wall 32, respectively. In this way, the strength of the spout 10 and the side wall 32 can be increased. As illustrated in FIG. 9(a) and FIG. 9(b), each of the ribs 10r and 30r is formed to have a cross section protruding outward from the upper end and further bent downward. However, the rib is not limited to this shape, and for example, a long columnar body may be provided at the upper end of the peripheral edge.

Figure 10:
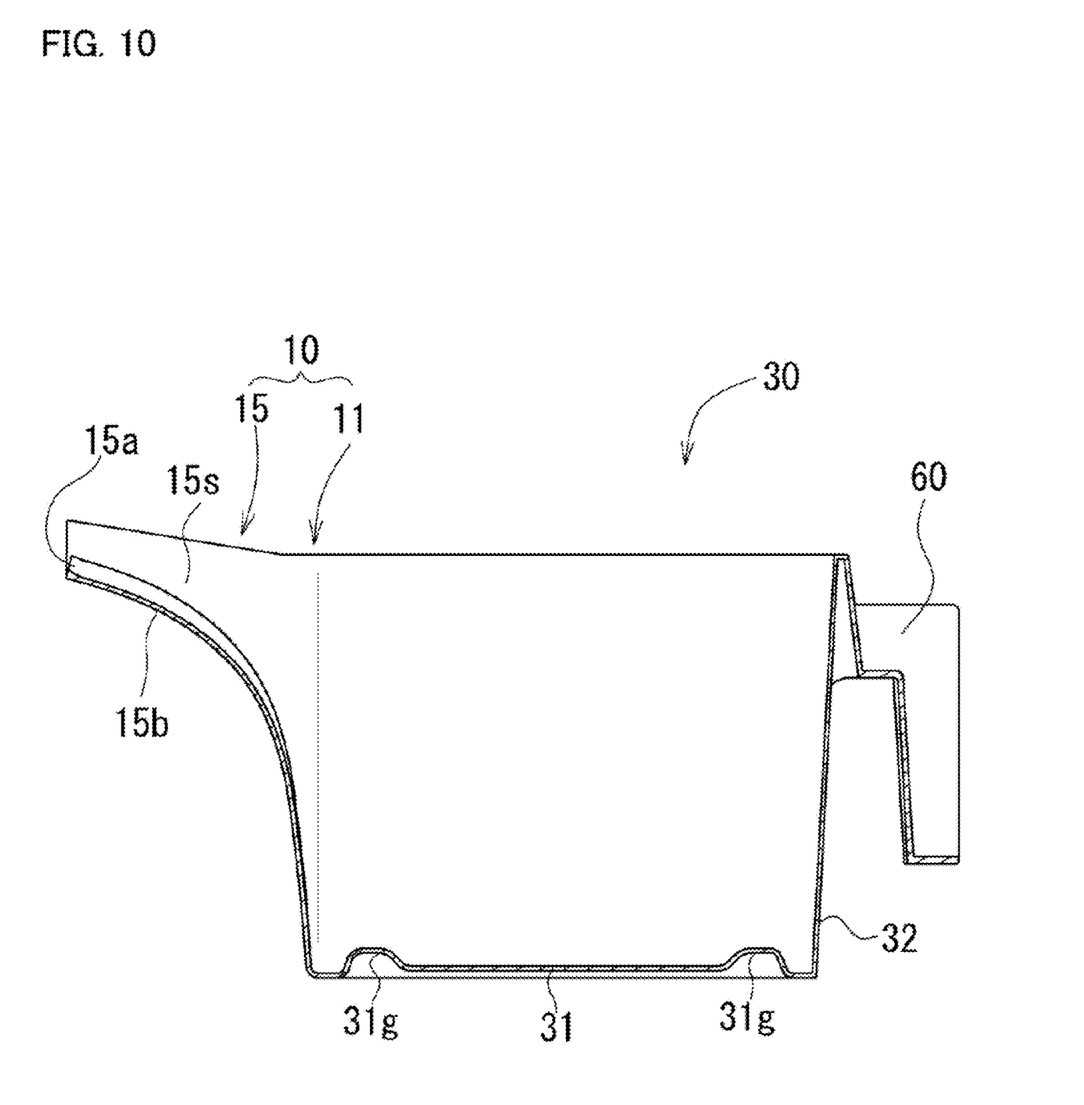
FIG. 10 is a sectional view taken along line Z-Z in FIG. 8 in which a handle is omitted.

As illustrated in FIG. 10, the watering can 2 further includes a recessed portion 31g circumferentially provided near an outer peripheral end on an outer surface of the bottom wall 31. The recessed portion 31g can be provided separately on the outer surface of the bottom wall 31, but is preferably recessed on the outer surface of the bottom wall 31 by integral molding. It is possible to hook a hand on the recessed portion 31g to support the bottom wall 31.

The material of the handle 50, the grip 60, and the ribs 10r and 30r of the watering can 2 is the same as the material of the watering can 1, and is as described above.

Here, it is preferable that the spout 10, the water storage 30, the grip 60, and the ribs 10r and 30r be integrally molded by injection molding of a resin material.

Although the watering can 2 according to the second embodiment includes the handle 50 and the grip 60, the watering can 2 may include only the handle 50 or only the grip 60.

As shown in FIG. 8, the bottomed tubular shape has a forward side 71 and a backward side 72. The bottom wall 31 includes a first circumferential base end 31a and a second circumferential base end 31b.

The material, other configurations, and functions and effects of the watering can 2 are the same as those of the first embodiment, and are as described above.

Third Embodiment

Figure 11:
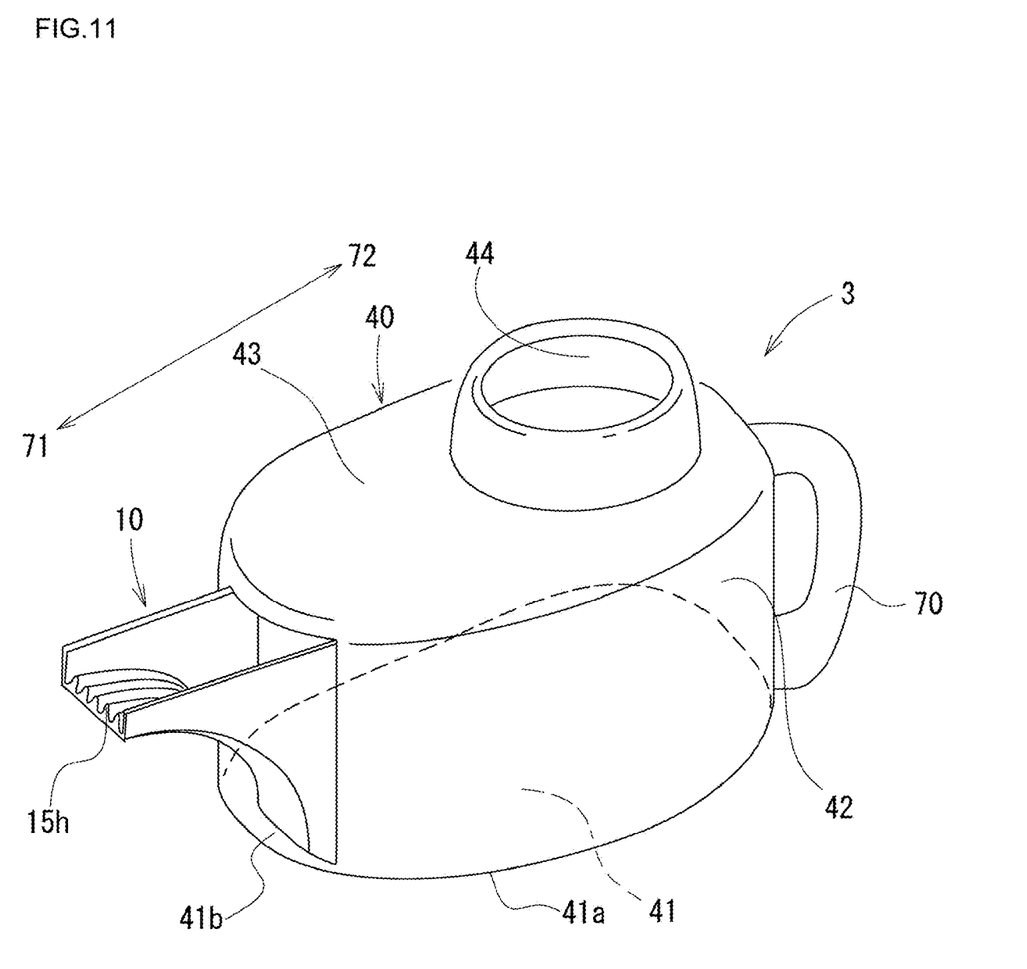
FIG. 11 is a schematic perspective view of a watering can according to a third embodiment.

As illustrated in FIG. 11, a watering can 3 according to a third embodiment includes a water storage 40, the spout 10 communicating with the water storage 40, and a grip 70. As for the spout 10, the spout 10 according to the first embodiment directly communicates with the water storage 40.

The configuration and operational effect of the spout 10 are as described in the first embodiment.

The water storage 40 is formed in a bottomed tubular shape including a bottom wall 41 and a side wall 42. In addition, a lid 43 is provided in an upper portion, and a water pouring port 44 with a cylindrical shape is provided on the lid 43.

As shown in FIG. 11, the bottomed tubular shape has a forward side 71 and a backward side 72. The bottom wall 41 includes a first circumferential base end 41a and a second circumferential base end 41b.

The material, other configurations, and functions and effects of the watering can 3 are the same as those of the first and second embodiments, and are as described above.

REFERENCE SIGNS LIST 1, 2, 3 Watering can
10 Spout
15 Flow channel
15g Recessed groove
20, 30, 40 Water storage
21, 31, 41 Bottom wall
22, 32, 42 Side wall
31g Recessed portion
10r, 30r Rib
50 Handle
60, 70 Grip

The invention claimed is:

1. A watering can comprising:
a water storage with a bottomed tubular shape having a forward side and a backward side, the bottomed tubular shape comprising:
   a bottom wall comprising a first circumferential base end and a second circumferential base end;
   a side wall extending upward from the first circumferential end; and
   a spout extending upward from the second circumferential base end and extending from the side wall in a direction of the forward side, the spout communicating with the water storage and allowing water to flow out of the water storage, the spout comprising:
      a distal end positioned at a forward end in the direction of the forward side,
      a flow channel formed of a plurality of recessed grooves and protruding tips extending in parallel in a direction of water flow such that the recessed grooves and protruding tips are provided alternatively to allow water to flow out of the water storage from the distal end,
   wherein in side view, the spout is inclined upward from the second circumferential base end to the distal end of the spout and formed to be curved and convex upward and outward,
   wherein in plain view, the spout is the same width upward from the second circumferential base end to the distal end of the spout,
   wherein the recessed grooves are formed throughout the entire length of the flow channel.

2. The watering can according to claim 1, further comprising a handle and/or a grip, wherein
the handle is bridged between opposed sides of the side wall, and
the grip is provided on the side wall.

3. The watering can according to claim 1, wherein the recessed grooves extending in the direction of the forward side become narrow near the distal end.

4. The watering can according to claim 1, wherein inner surfaces of the recessed grooves extending in the direction of the forward side have formed bulges near the distal end of the spout.

5. The watering can according to claim 1, further comprising a recessed portion circumferentially provided near an outer peripheral end on an outer surface of the bottom wall.

6. The watering can according to claim 1, further comprising a rib for reinforcement provided at an upper end of the spout and/or an upper end of the side wall.

* * * * *